US005605176A

United States Patent [19]
Herzberger

[11] Patent Number: 5,605,176
[45] Date of Patent: Feb. 25, 1997

[54] POSITION INDICATOR FOR ON/OFF VALVES

[75] Inventor: Richard C. Herzberger, Bay City, Mich.

[73] Assignee: Servapure Company, Bay City, Mich.

[21] Appl. No.: 517,739

[22] Filed: Aug. 22, 1995

[51] Int. Cl.$^6$ ................................................. F16K 37/00
[52] U.S. Cl. ........................... 137/556; 116/215; 116/277
[58] Field of Search ............................... 137/556, 556.3, 137/556.6; 116/215, 277

[56] References Cited

U.S. PATENT DOCUMENTS

| | | |
|---|---|---|
| 1,312,303 | 8/1919 | Berry . |
| 2,104,520 | 1/1938 | Jackson et al. . |
| 2,104,521 | 1/1938 | Jackson et al. . |
| 2,617,381 | 11/1952 | Insul ........................................ 116/277 |
| 2,820,477 | 1/1958 | Dorsak et al. ........................... 137/556 |
| 2,930,343 | 3/1960 | Derrick . |

*Primary Examiner*—Edward K. Look
*Assistant Examiner*—Christopher Verdier
*Attorney, Agent, or Firm*—Learman & McCulloch

[57] ABSTRACT

A valve position indicator for on/off valves includes a card having red and green sectors journalled in a housing, and gravity biased to remain stationary during rotation of the housing about a non-vertical axis. A cover of the housing overlies the card and includes a window through which either the red or green sector is visible. The device may be mounted within a recess of the handle of an on/off valve to indicate correct and incorrect positioning of the valve. The valve is in the correct position when the green sector appears on the window and is incorrectly positioned when the red sector appears in the window. A locking tab projects from the housing and is received within one of two detents of the valve handle to align the window with either the red or green sector, respectively, when the handle is moved to the open position and vice versa.

17 Claims, 1 Drawing Sheet

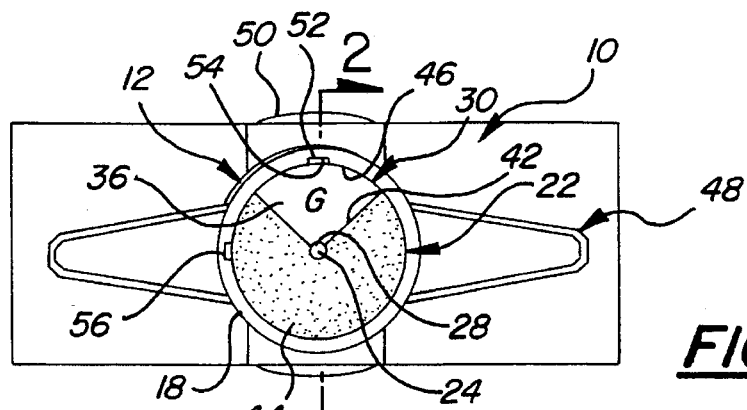
FIG-1
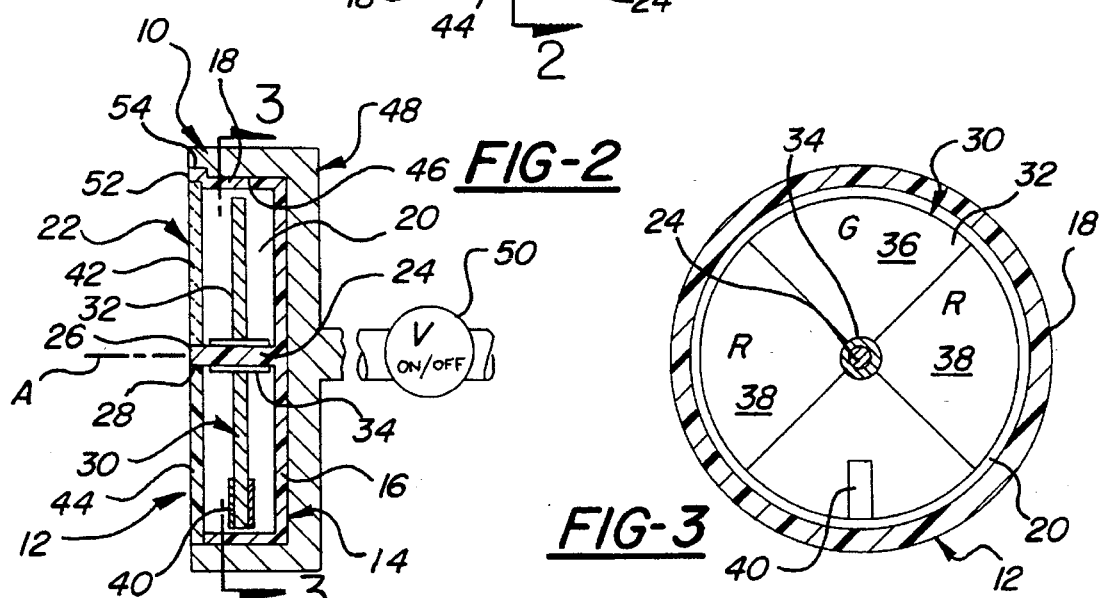
FIG-2
FIG-3
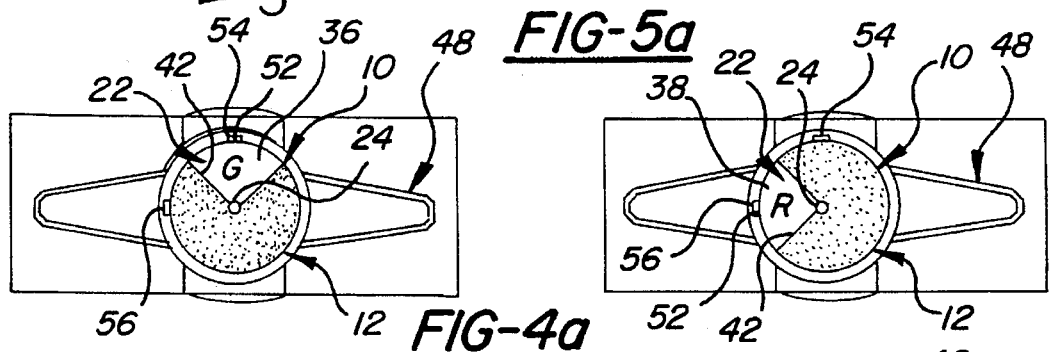
FIG-4a   FIG-5a
FIG-4b   FIG-5b

POSITION INDICATOR FOR ON/OFF VALVES

This invention relates to gravity-responsive position indicating devices and particularly those for on/off valves of a fluid float system to indicate whether the valves are in the proper on or off positions.

BACKGROUND OF THE INVENTION

In many process flow systems, such as those employed for the treatment of drinking water, waste water, and dialysis equipment for the treatment of human blood, numerous on/off valves are required to direct the flow of fluid properly along a selected path. Although visual inspection of the positions of the handles of the valves enables an operator to determine whether the various valves are in the open or closed position, the operator must still verify that such are the correct positions necessary to direct the fluid along the selected path for a given application. At present, verification of the correct positioning of the valves is carried out by the operator verifying the open/closed position of each valve against a process flow diagram. Not only is this verification a tedious, time consuming process, but it lends itself to operator error such as the misreading of the flow diagram or improper identification of the valves. In some process flow systems, such as those mentioned above, a mispositioned valve can have serious, potentially life-threatening implications.,

SUMMARY OF THE INVENTION

The present invention addresses the problems discussed above by providing a device that enables an operator to determine very quickly and easily by visual inspection whether the valves of a fluid flow system are correctly positioned without reference to a process flow diagram.

The valve position indicator device comprises a housing that is adapted to be mounted on the handle of an on/off valve for rotation therewith between the open and closed valve positions of the handle. A gravity-responsive position card is journalled by the housing for rotation about a non-vertical axis and includes first and second indicia that represent correct and incorrect positioning of the valve handle with respect to the open and closed valve positions. In a preferred embodiment, the position card is provided with a green sector indicium representing the correct position of a valve and an adjacent red sector indicium for indicating the incorrect position. The card is weighted so as to retain at all times the card and its indicia in a substantially stationary attitude by gravity.

An indicator in the preferred form of a window in a cover of the housing overlies the position card and is movable with the housing relative to the stationary indicia between the open and closed valve positions. The cover can be oriented in one of two positions on the handle such that when in one position the green sector appears in the window when the valve is moved to the open position and the red sector appears when the valve is moved to the closed position indicating correct and incorrect positioning of the valve, respectively. When the window is oriented in the second position, the opposite events occur such that the red indicia appears in the window when the handle is in the open position and the green indicia appears when the handle is in the closed position to indicate that the open position is incorrect and the closed position is correct.

THE DRAWINGS

The presently preferred embodiment of the invention is disclosed in the accompanying drawings, wherein:

FIG. 1 is a front elevational view of a position indicator device mounted on the handle of an on/off valve;

FIG. 2 is a cross-sectional view taken along the line 2—2 of FIG. 1;

FIG. 3 is a sectional view taken along the line 3—3 of FIG. 2;

FIGS. 4a and 4b show the position indicator device oriented in the first position on the valve handle to indicate correct and incorrect positioning, respectively, of the valve handle as it is moved between the open (4a) and closed (4b) positions; and FIGS. 5a and 5b show the position indicator device oriented in the second position on the valve handle to indicate incorrect and correct positioning of the valve handle, respectively, when moved between the open (5a) and closed (5b) valve positions.

DETAILED DESCRIPTION

A valve position indicator device constructed according to a presently preferred embodiment of the invention is indicated generally at 10 on the drawings and comprises a housing 12 having a base portion 14 formed with a generally circular bottom wall 16 and an upstanding cylindrical side wall 18 defining a compartment 20 of the housing 12. The base portion 14 may be molded of suitable plastics materials. The housing 12 further includes a circular cover 22 mounted on the free end of the side wall 18 opposite the bottom wall 16 to close the compartment 20.

A spindle 24 is secured at one end to the bottom wall 16 and extends along a central axis A through the compartment 20 and terminates in a reduced diameter end 26 accommodated in a central. aperture 28 in the cover 22. A gravity-responsive position card 30 is journalled on the spindle 24 for rotation within the compartment 20 relative to the housing 12. The position card 30 has a circular configuration with a front face 32 underlying the cover 22. The card 30 mounts a central cylindrical bushing 34 that is supported for rotation about the axis of the spindle 24 to provide relative rotation between the card 30 and housing 12.

The card 30 has on its face first and second indicia 36, 38 corresponding to correct and incorrect positioning, respectively, of an on/off valve handle with respect to its open and closed positions. The first indicium 36 is in the form of a green 90° sector of the card 30, whereas the second indicium 38 comprises at least one and preferably a pair of red 90° sectors adjacent opposite sides of the green sector 36, as illustrated in FIG. 3. Green and red are-chosen for their universal visual understanding as representing "correctness" and "incorrectness."

A weight 40 is mounted on the card 30 opposite the green sector 36 to maintain by gravity the card 30 and its red and green indicia 36, 38 in a substantially fixed angular attitude shown in FIG. 3 when the housing 12 and its cover 22 are rotated about the non-vertical axis A of the axle 24. The cover 22 has a transparent window 42 in the form of a 90° sector of the cover 22 corresponding to the general size and shape of the green and red sectors of the card 30. The window 42 of the cover enables an operator to view that portion of the indicator card 30 underlying the window 42. The remaining portion of the cover 22 is preferably opaque to conceal all but that portion of the card 30 visible through the window 42.

The device 10 may be mounted in a recess 46 in the handle 48 of an on/off valve 50 and means are provided for positively orienting the window 42 in either one of two angular positions on the handle 48 for movement therewith between the open and closed (or on and off) valve positions of the handle 48. The preferred means of orienting the window 42 in either the first or second position on the handle 48 comprises at least one radial locking projection or tab 52 extending radially outwardly of the housing 12 for accommodation in either one of two correspondingly-shaped locking depressions or detents 54, 56 of the handle projecting radially outwardly of the recess 46 of the handle 48. Only when the locking tab 52 is aligned with one or the other detents 54, 56 may the device 10 be fully engaged with the handle 48. In this way, the locking tab 52 and the detents 54, 56 positively locate the window 42 in either the first or second position on the handle and, once engaged, serve to lock the window 42 in position on the handle 48 preventing any further relative angular movement between the window 42 and the handle 48.

FIGS. 4 and 5 illustrate the operation of the device 10. In FIGS. 4a and 4b, the locking tab 52 is aligned with the detent 54 to orient and lock the window 42 in the first position. When the handle 48 is rotated to the open position, shown in FIG. 4a, the window 42 rotates with the handle 48 and is brought into alignment with the green sector 36 of the card to indicate to the operator that the open position of the valve handle is the "correct" position for that valve. In FIG. 4b the handle 48 is rotated through 90° to the closed position bringing the window 42 into alignment with the red sector 38 indicating that the valve handle is incorrectly positioned when closed.

FIGS. 5a and 5b illustrate the opposite setup in which the locking tab 52 is received in the detent 56 to orient the window 42 in the second position on the handle 48. In this case the window 42 overlies the red sector 38 when the valve is open and overlies the green sector when the valve is closed to indicate incorrect and correct positioning, respectively, of the valve handle 48.

In a fluid flow system having numerous such on/off valves 50, it is likely that when properly set, some valves will be open whereas others will be closed to direct the flow of fluid along a predetermined path. Such fluid flow systems might include, for example, drinking and waste water treatment facilities, dialysis machines, and other flow systems. In such systems, each valve handle is provided with an indicator device 10 and installed with the window 42 oriented in either the first or second position on the handle such that the green sector 36 appears in the window 42 when the handles are properly set to their respective on or off positions. Once the indicators are properly set, the operator can determine at any time thereafter by a quick visual inspection whether the various valves are in their proper open or closed positions. Any incorrectly positioned valves will stand out by virtue of the red-colored sector 38 appearing in the window 42 of the indicator device 10.

The disclosed embodiment is representative of a presently preferred form of the invention, but is intended to be illustrative rather than definitive thereof. The invention is defined in the claims.

I claim:

1. A valve position indicator device for on/off valves, comprising:

a housing adapted to be mounted on a rotatable handle of an on/off valve for rotation therewith between open and closed positions of the valve handle;

a gravity-responsive position card journaled by said housing for rotation about a nonvertical axis, said card having first and second indicia representing correct and incorrect positioning of the valve handle with respect to the open and closed valve positions, said card being gravity biased with respect to said axis to retain said card and said indicia substantially stationary during movements of said housing between the open and closed valve positions;

an indicator overlying said position card and movable with said housing relative to said indicia between the valve positions and alignable with a preselected one or other of said correct and incorrect indicia when the handle is moved to the open valve position and alignable with the other of said correct and said incorrect indicia when the handle is moved to the closed position; and orientation means for orienting said indicator in a selected one of two positions on said handle such that when oriented in a first of said two positions said indicator aligns with said correct indicia when the handle is moved to the open position and aligns with said incorrect indicia when the handle is moved to the closed position, and when oriented in the second of said two positions said indicator aligns with said incorrect indicia when the handle is moved to the open position and aligns with said correct indicia when the handle is moved to the closed position.

2. The device of claim 1 wherein said housing includes a cover overlying said position card and said indicator comprises a transparent window in said cover through which said indicia is visible.

3. The device of claim 2 wherein said orientation means comprises at least one locking portion provided on said housing and engageable with a selected one of at least two associated locking portions of the handle so as to locate and positively retain said window in said selected one of said two positions.

4. The device of claim 1 wherein said correct indicia comprises a green region of said position card and said incorrect indicia comprises a red region of said position card.

5. The device of claim 4 wherein said position card is circular and said red and green regions comprise adjacent 90 degree sectors of said card.

6. The device of claim 5 wherein said window is in the shape of a 90 degree sector of generally the same general size and area as each of said red and green sectors of said card.

7. The device of claim 6 wherein the remainder of said cover is opaque to conceal all of the position card except that portion of said card underlying said window.

8. The device of claim 4 wherein said position card supports a weight opposite said green region for retaining said green region in a generally upright vertical attitude.

9. The device of claim 3 wherein said housing is substantially circular and said locking portion comprises at least one projection extending radially outwardly from said housing.

10. The device of claim 2 wherein said housing includes a spindle extending through said housing and wherein said position card includes a central bushing journaled on said spindle.

11. A valve position indicator device for on/off valves comprising: a housing adapted for mounting on a handle of an on/off valve for movement therewith between open and closed valve positions of the handle, said housing having a base, a cover, and a spindle extending between said cover and said base along a nonvertical axis, said cover having a window providing a view to the inside of said housing; a gravity-responsive position card accommodated within said housing and journaled by said spindle to permit relative rotation between said housing and said card about said axis, said card having a face underlying said cover and provided with green indicia and adjacent red indicia representing correct and incorrect positioning, respectively, of the valve handle with respect to the open and closed valve positions; and said card being gravity biased to retain said card and said indicia substantially stationary when said housing is rotated with the handle for alternately displaying through said window said red and said green indicia.

12. The device of claim 11 including orientation means to enable said window to be oriented in a selected one of two angular positions on the handle such that when oriented in a first of said two positions said green and red indicium, respectively, appear in said window when said housing is moved with the handle to the open and closed positions and when oriented in a second of said two positions said red and green indicium, respectively, appear in said window when said housing is moved to the open and closed positions.

13. The device of claim 12 wherein said orientation means comprises at least one projection extending radially outwardly of said housing for registering with at least two associated notches in the housing corresponding to the first and second angular positions of said window.

14. The device of claim 11 wherein said card is circular and said red and green indicia comprise adjacent sectors of said card.

15. The device of claim 14 wherein said cover is circular and said window comprises a sector said cover of such size as to enable only one of said red and green sectors to be viewed in its entirety through said window.

16. The device of claim 15 wherein the remainder of said cover is opaque to conceal from view all but that portion of the card visible through said window.

17. The device of claim 15 wherein said red indicium and said green indicium are each 90 degree sectors of said card, and said window is a 90 degree sector of said cover.

* * * * *